US008356791B1

(12) United States Patent
Blom (10) Patent No.: US 8,356,791 B1
(45) Date of Patent: Jan. 22, 2013

(54) TUBING SQUEEZE-OFF APPARATUS

(76) Inventor: Gerald E. Blom, Casper, WY (US)

( * ) Notice: Subject to any disclaimer, the term of this patent is extended or adjusted under 35 U.S.C. 154(b) by 0 days.

(21) Appl. No.: 13/247,432

(22) Filed: Sep. 28, 2011

(51) Int. Cl.
*F16K 7/04* (2006.01)

(52) U.S. Cl. ............................ 251/9; 251/4; 251/5

(58) Field of Classification Search ........... 251/4, 5, 251/9; 294/115; 269/32, 228, 268; 137/315.07
See application file for complete search history.

(56) References Cited

U.S. PATENT DOCUMENTS

| | | | | |
|---|---|---|---|---|
| 2,770,439 | A * | 11/1956 | Stafford et al. ............... | 177/73 |
| 3,011,750 | A * | 12/1961 | Johnson et al. ............... | 251/5 |
| 3,315,679 | A * | 4/1967 | Sarracino ...................... | 606/120 |
| 3,371,953 | A * | 3/1968 | Blatt ............................. | 294/202 |
| 3,408,034 | A * | 10/1968 | Lau .............................. | 251/9 |
| 3,567,208 | A * | 3/1971 | Blatt ............................. | 269/32 |
| 3,612,475 | A * | 10/1971 | Dinger .......................... | 251/10 |
| 3,708,149 | A * | 1/1973 | Dinger .......................... | 251/9 |
| 4,081,170 | A * | 3/1978 | Doss, Jr. ...................... | 251/5 |
| 4,257,446 | A | 3/1981 | Ray | |
| 4,304,433 | A * | 12/1981 | Langowski .................... | 294/106 |
| 4,582,292 | A * | 4/1986 | Glotzback et al. ............. | 251/9 |
| 4,705,331 | A * | 11/1987 | Britton .......................... | 439/387 |
| 4,728,137 | A * | 3/1988 | Hamed et al. .................. | 294/202 |
| 4,744,596 | A * | 5/1988 | Hiller et al. ................... | 294/202 |
| 4,978,100 | A | 12/1990 | Peurifoy | |
| 5,071,102 | A * | 12/1991 | Gray ............................. | 251/4 |
| 5,273,252 | A * | 12/1993 | Brugalieres et al. ........... | 251/9 |
| 5,284,375 | A * | 2/1994 | Land, III ....................... | 294/202 |
| 6,450,555 | B1 * | 9/2002 | Collister et al. ............... | 292/210 |
| 6,695,278 | B2 * | 2/2004 | Ellis .............................. | 251/5 |
| 7,159,838 | B2 | 1/2007 | Champagne et al. | |
| 7,337,648 | B2 * | 3/2008 | Green ............................ | 72/416 |
| 7,559,525 | B2 | 7/2009 | Grimes | |
| 8,122,751 | B2 * | 2/2012 | Green ............................ | 72/416 |

OTHER PUBLICATIONS

Footage Tools Inc., http://www.footagetools.com/c165.htm, pp. 1-2, Jun. 10, 2010.
Footage Tools Inc., http://www.footagetools.com/c850.htm, pp. 1-2, Jun. 10, 2010.
Green, Kenneth H. et al., "Development of a Remote External Repair Tool for Damaged or Defective Polyethylene (PE) Gas Pipe," pp. 1-8, dated Oct. 3, 2006.

* cited by examiner

*Primary Examiner* — John K Fristoe, Jr.
*Assistant Examiner* — Andrew J Rost
(74) *Attorney, Agent, or Firm* — Samuel M. Freund; Cochran Freund & Young LLC (57) ABSTRACT

A squeeze-off apparatus and method for at least partially locally interrupting the flow of a fluid in a resilient tube or pipe are described. Tubes may be accessed from a single direction, thereby eliminating the need for significant excavation around a buried tube. Squeeze-off is performed using two pairs of jaws which close in a parallel manner, the closed distance between the jaws being adjustable depending on the wall thickness of the tubing, thereby permitting the tube to remain integral for at least one such crimping and release cycle. Embodiments of the squeeze-off apparatus may be locked in place once the tube is crimped, thereby permitting the flow to be reduced or shut off without continued application of force to the squeeze-off jaws of the apparatus.

17 Claims, 8 Drawing Sheets

TUBING SQUEEZE-OFF APPARATUS

FIELD OF THE INVENTION

The present invention relates generally to tubing crimping tools and, more particularly, to a tubing squeeze-off tool requiring access to the tubing from a single direction, for cutting off or at least reducing the flow of fluid flowing in a resilient tube or pipe.

BACKGROUND OF THE INVENTION

Buried, resilient pipes, such as polyethylene (PE) pipes are used extensively throughout the United States for natural gas transmission and distribution. Leaks in such pipes must be quickly attended to because of the risk of explosion since the fluid is both flammable and under pressure. With increasing natural gas consumption, pipeline repair has become increasingly important. Current procedures for repairing buried natural gas pipes require excavations both upstream and downstream of the damage, and isolation of the damaged section of pipe by stopping the flow of fluid on both sides of the damage. The damaged section may then be repaired or replaced.

Designation: F 1563-01 of the ASTM International defines "squeeze-off" as a technique used to control the flow of gas through a pipe by the compressing action of a mechanical, hydraulic or pneumatic device. Additionally, squeeze-off may be used, as recommended by the tool or pipe manufacturer, to reduce the flow of gas to an acceptable rate, and under certain conditions complete stoppage of flow may be obtained.

Gas Industry Standard, GIS/PL2-7:2006, further requires that squeeze-off shall be limited by a positive mechanical 'stop' capable of being interchanged or reset for the specified size ranges, and the squeeze-off tool shall be capable of being locked mechanically in the loaded position when squeeze-off is fully applied In order to expedite the excavation of pipe access holes or trenches, such holes or trenches are kept relatively small, especially when large digging equipment is unavailable. Access to the tube or pipe to be squeezed-off or crushed is therefore generally from the top or side thereof, and it is advantageous to employ squeeze-off tools which may be installed and withdrawn by a single operator; that is, tools which are relatively light and maneuverable, yet are capable of reversibly squeezing off pipes having diameters as large as 4 in. in which a fluid, such as a pressurized gas or liquid is flowing.

SUMMARY OF THE INVENTION

Embodiments of the present invention overcome the disadvantages and limitations of the prior art by providing a crushing or squeeze-off apparatus for at least partially interrupting the flow of a fluid in a resilient tube or pipe.

It is another object of embodiments of the present invention to provide a squeeze-off apparatus for at least partially interrupting the flow of a fluid in a resilient tube, and adapted for accessing the tube from a single direction.

It is yet another object of embodiments of the present invention to provide a squeeze-off apparatus for at least partially interrupting the flow of a fluid in a resilient tube adapted for accessing the tube from a single direction, and which can be locked in place once the tube is crimped.

It is another object of embodiments of the present invention to provide a squeeze-off apparatus for at least partially interrupting the flow of fluid in a resilient tube, wherein the tube remains integral for at least one crimping and release cycle.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention as embodied and broadly described herein, the squeeze-off apparatus hereof, includes: a first elongated base member having a flat first side and a flat second side; a second elongated base member having a flat first side and a flat second side, wherein the first side of the first base member is parallel to, spaced apart from and faces the first side of the second base member; a drive block adapted to slide between the first base member and the second base member; a first inner jaw member rotatable about a first pivot centrally located on the first jaw member, and in the vicinity of one end of the first base member and the second base member; a second inner jaw member rotatable about the first pivot centrally located on the second jaw member and in the vicinity of one end of the first base member and the second base member, the first jaw member and the second jaw member rotating between the first base member and the second base member, each inner jaw member having a leg portion on each side of the pivot thereof together forming a generally C-shaped opening capable of receiving the tubing; at least one pair of actuating bars, one end of each actuating bar pivotably attached to an end of the first inner jaw member opposite the leg portion thereof, the opposite end of each actuating bar being pivotably attached to the drive block; a first squeeze-off jaw rotatable in the vicinity of a first end thereof about a second pivot location on the leg portion of the first inner jaw member; a second flat squeeze-off jaw rotatable in the vicinity of a first end thereof about a second pivot location on the leg portion of the second inner jaw member; a pair of first positioning bars, one end of each first positioning bar pivotably attached in the vicinity of a second end of the first squeeze-off jaw or the second squeeze-off jaw opposite the first end thereof, the second end of each first positioning bar being pivotably attached to the first base member; a third squeeze-off jaw rotatable in the vicinity of a first end thereof about the second pivot location on the leg portion of the first inner jaw member; a fourth squeeze-off jaw rotatable in the vicinity of a first end thereof about the second pivot location on the leg portion of the second inner jaw member; a pair of second positioning bars, one end of each second positioning bar pivotably attached in the vicinity of a second end of the third squeeze-off jaw or the fourth squeeze-off jaw opposite the first end thereof, the second end of each second positioning bar being pivotably attached to the second base member; and means for moving the drive block between the first base member and the second base member; whereby a uniform gap is maintained between the first squeeze-off jaw and the second squeeze-off jaw, and between the third squeeze-off jaw and the fourth squeeze-of jaw as the drive block is moved.

In another aspect of the present invention, and in accordance with its objects and purposes, the method for squeezing-off a tube having a puncture or break in the wall thereof hereof, includes: providing a tubing squeeze-off apparatus having a first pair of parallel-closing squeeze-off jaws and a second pair of parallel-closing squeeze-off jaws spaced apart from the first pair of squeeze-off jaws; providing a first squeeze-off retainer effective for maintaining the tube in a squeezed-off condition, and a second squeeze-off retainer effective for maintaining the tube in a squeezed-off condition; locating the squeeze-off apparatus such that the first pair of squeeze-off jaws straddles the tube on one side of the puncture or break of the tube, and the second pair of squeeze-off jaws straddles the tube on the side of the puncture or break opposite from the first pair of squeeze-off jaws; crimping the tube on both sides of the puncture or break by simultaneously closing the first pair of squeeze-off jaws and the second pair of squeeze-off jaws; placing the first retainer on the tube alongside the first pair of squeeze-off jaws; placing the second retainer on the tube alongside the second pair of squeeze-off jaws; opening the first pair of squeeze-off jaws and the second pair of squeeze-off jaws; and removing the squeeze-off apparatus from the tube.

Benefits and advantages of embodiments of the present invention include, but are not limited to, providing a squeeze-off tool for at least partially interrupting the flow of a fluid in a tube or pipe, wherein the tool is effective for accessing two diametrically opposed surfaces of the tube or pipe to be squeezed-off or crushed from a single direction, and which can be locked in place once the tube is crimped.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 1A is a schematic representation of the top view of an embodiment of the present tubing squeeze-off apparatus showing the squeeze-off jaws in their open configuration, while

FIG. 5A is a schematic representation of a top schematic view of a cutaway of the piston and cylinder of the tubing squeeze-off apparatus illustrated in FIG. 1A hereof, with the top base member having been removed, and showing the return spring; while

FIG. 6A is a schematic representation of a side view of one inner jaw of tubing squeeze-off apparatus illustrated in FIG. 2B hereof, while

DETAILED DESCRIPTION OF THE INVENTION

Briefly, embodiments of the present invention include a crimping or squeeze-off apparatus or tool for at least partially interrupting the flow of a fluid in a resilient tube or pipe. Tubes may be accessed from a single direction, such as from above or from the side thereof, depending on the direction of excavation, thereby reducing the need for significantly excavation under and around the tube. Sufficient exposure of the tube to be squeezed-off or crimped that two diametrically opposed surfaces are accessible to the present tool, is all that is required. The tube squeeze-off apparatus may be locked in place once the tube is crimped, thereby permitting the flow to be reduced or shut off without continued application of force to the apparatus. Squeeze-off is performed using two pairs of jaws which close in a parallel manner, the closest distance between the jaws being adjustable depending on the wall thickness of the tubing, thereby permitting the tube to remain integral or intact for at least one such crimping and release cycle.

In what follows, the words, crimping, squeezing-off, crushing and pinching-off, as applied to deformable, resilient tubes or pipes, will be used interchangeably.

Figure 1A:
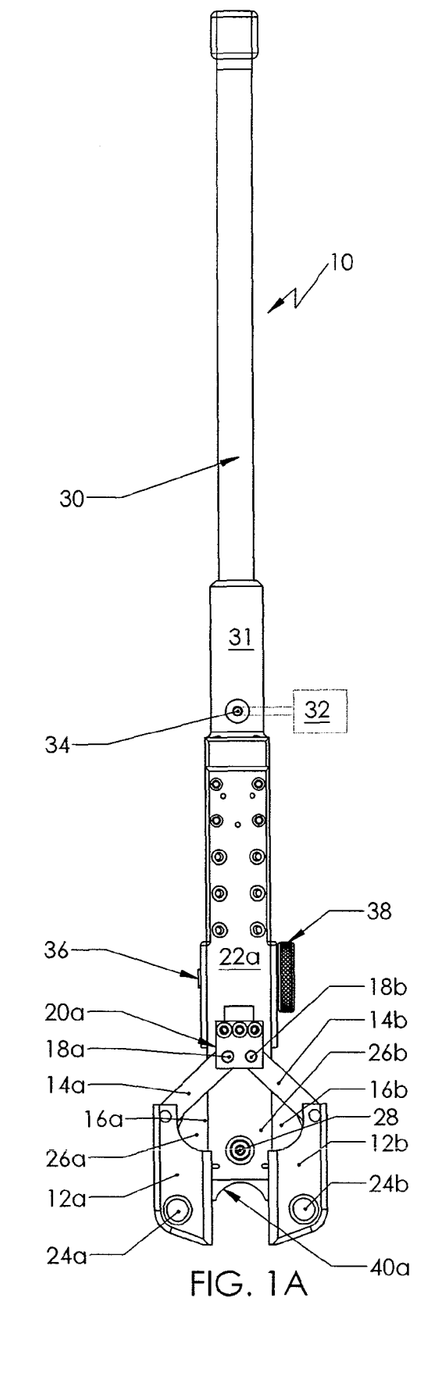

Reference will now be made in detail to the present embodiments of the invention, examples of which are illustrated in the accompanying drawings. In the FIGURES, similar or identical structure will be identified using identical reference characters. Turning now to FIG. 1A, a schematic representation of the top view of an embodiment, 10, of the present squeeze-off apparatus is illustrated, showing upper pair of squeeze-off jaws, 12a, and 12b, in their open condition, located by positioning bars, 14a, and 14b, pivotably attached at locations, 16a, and 16b, respectively, to the jaws at one end, and pivotably attached at locations, 18a, and 18b, to block, 20a, which is attached to upper base member, 22a, at the other end, and by pivot locations, 24a, and 24b, attached to the legs of inner jaws, 26a, and 26b, respectively. Inner jaws 26a and 26b are pivoted at pivot location, 28, located in upper base member 22a, as will be described in more detail hereinbelow. Handle, 30, is shown attached to the end of handle mounting member, 31, disposed at the other end of base members 22a (and 22b, shown in FIG. 1B hereof) from pivot location 28. A hydraulic piston, not shown in FIG. 1A, driven by pressure source, 32, through pressure inlet, 34, in handle mounting member 31, operates inner jaws 26a and 26b, as will be described hereinbelow. Jaw closing distances are controlled by drive block stop rod, 36, which is rotated by knurled knob, 38, as will be explained in more detail hereinbelow, and are determined by the wall thickness of the resilient tubing to be crimped. Tubing guide, 40a, mounted to the open end of base member 22a, assists in holding the tubing to be crimped, and is used for tubing having less than 2 in. outer diameter, there being another guide, 40b, not shown in FIG. 1A, mounted to the open end of base member 22b. For 2 in. or larger outer diameter pipes, the open ends of base members 22a and 22b act as tubing stops, the rounded portions of guide 40a, no longer being required.

Figure 1B:
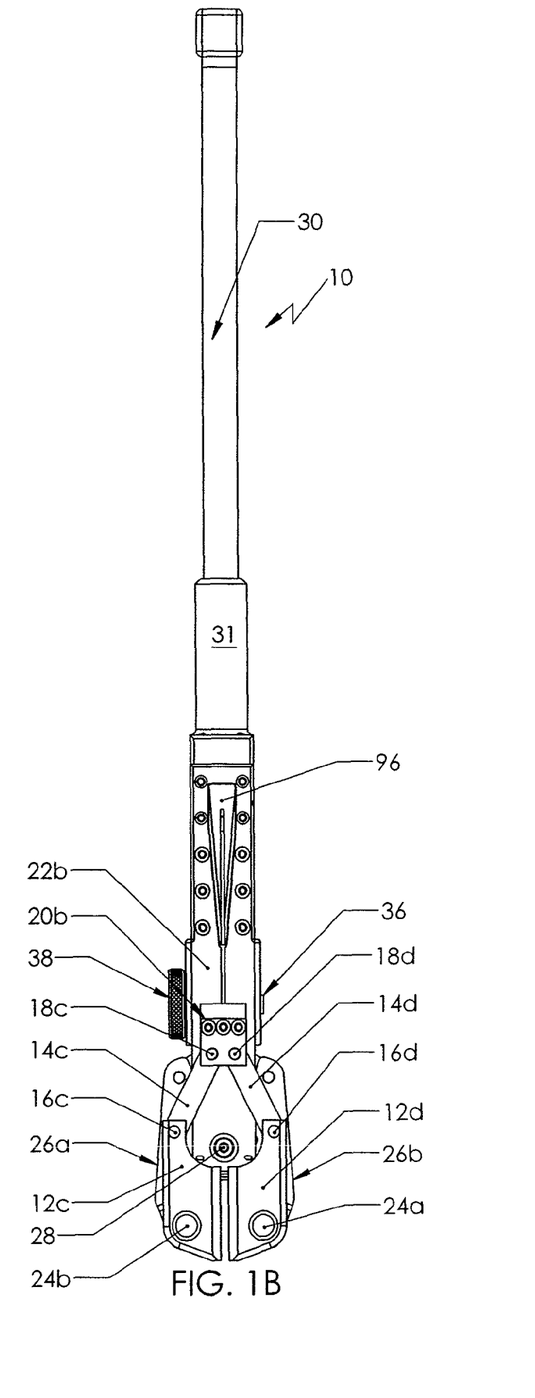
FIG. 1B is a schematic representation of the embodiment of the invention shown in FIG. 1A showing the squeeze-off jaws in a preset crimping configuration.

FIG. 1B is a schematic representation of the bottom view of the embodiment of squeeze-off apparatus 10 shown in FIG. 1A, hereof, with the lower pair of squeeze-off jaws, 12c, and 12d, in a preset crimping condition. Lower squeeze-off jaws, 12c, and 12d are located by positioning bars, 14c, and 14d, pivotably attached at locations, 16c, and 16d, respectively, to the jaws at one end, and pivotably attached at locations, 18c, and 18d, to block, 20b, which is attached to lower base member, 22b, at the other end, and by pivot locations, 24a, and 24b, attached to the legs of inner jaws, 26a, and 26b, respectively. In addition to providing a more gentle application of squeeze-off forces to pipes and tubing, the combination of lower squeeze-off jaws 12c and 12d with upper squeeze-off jaws 12a and 12b in squeeze-off apparatus 10 permits punctures and smaller breaks in the pipe or tubing which fit between the pairs of squeeze-off jaws to be isolated.

Figures 2A, 2B, 2C:
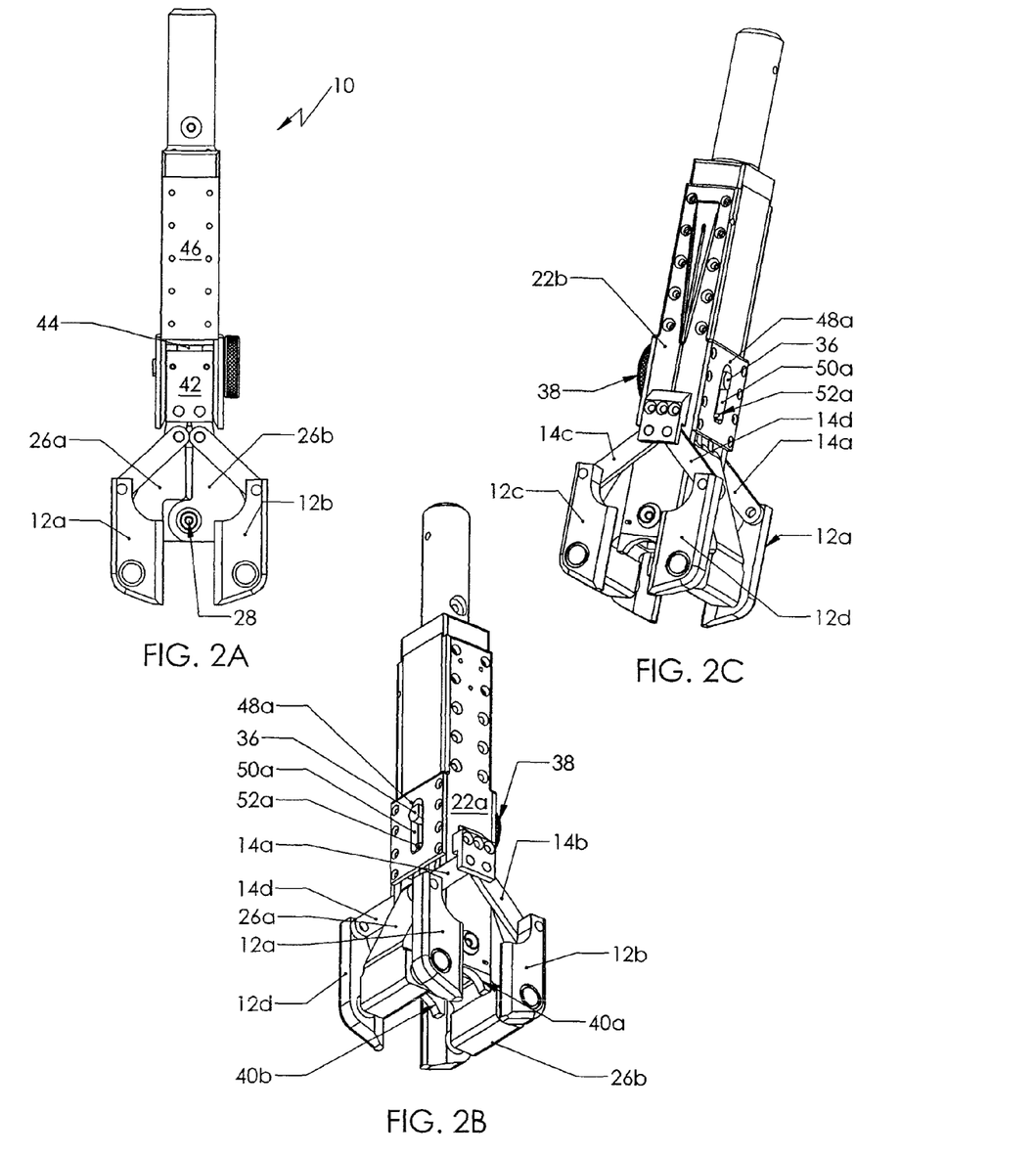
FIG. 2A is a schematic representation of the top view of the tubing squeeze-off apparatus illustrated in FIG. 1A hereof, with the top base member removed, showing the squeeze-off jaws in an open configuration as a result of the drive block being withdrawn with the consequent opening of the inner jaws.
FIG. 2B is a schematic representation of a perspective top view of the jaw portion of the squeeze-off apparatus shown in FIG. 2A hereof with the top base member in place, illustrating one of the drive block stopping plates attached thereto.
FIG. 2C is a schematic representation of a perspective bottom view of the jaw portion of the squeeze-off apparatus shown in FIG. 2B hereof with the bottom base member in place, illustrating the other of the drive block stopping plates attached thereto and components of an embodiment of the stopping mechanism.

FIG. 2A is a schematic representation of the top view of tubing crimping apparatus 10 illustrated in FIG. 1A hereof, with top base member 22a removed, showing squeeze-off jaws 12a and 12b in an open configuration as a result of drive block, 42, being withdrawn by piston rod, 44, into hydraulic or pneumatic cylinder, 46, with the consequent opening of inner jaws 26a and 26b. FIG. 2B is a schematic representation of a perspective top view of the jaw portion of the squeeze-off apparatus shown in FIG. 2A hereof with top base member 22a in place, illustrating drive block stopping plate, 48a, attached thereto, with slot, 50a, therein confining the motion of stop rod 36, and adjustable stop, 52a, at one end thereof. FIG. 2C is a schematic representation of a perspective bottom view of the jaw portion of the squeeze-off apparatus shown in FIG. 2B hereof with bottom base member 22b in place, also illustrating drive block stopping plate, 48a, attached thereto, with slot, 50a, therein confining the motion of stop rod 36, and adjustable stop 52a at one end thereof. It should be mentioned that since there are two pairs of tubing squeeze-off jaws, a length of tubing or pipe to be crimped or squeezed-off, will be squeezed-off at two longitudinally separated locations on the tube.

Figure 3A:
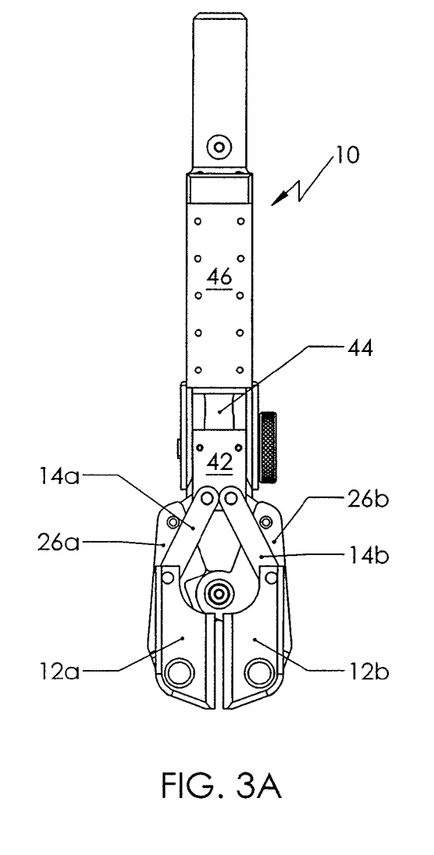
FIG. 3A is a schematic representation of the top view of the tubing squeeze-off apparatus illustrated in FIG. 1A hereof, with the top base member removed, showing the squeeze-off jaws in a preset crimping condition as a result of the drive block being pushed forward with the consequent closing of the inner jaws.
Figure 3B:
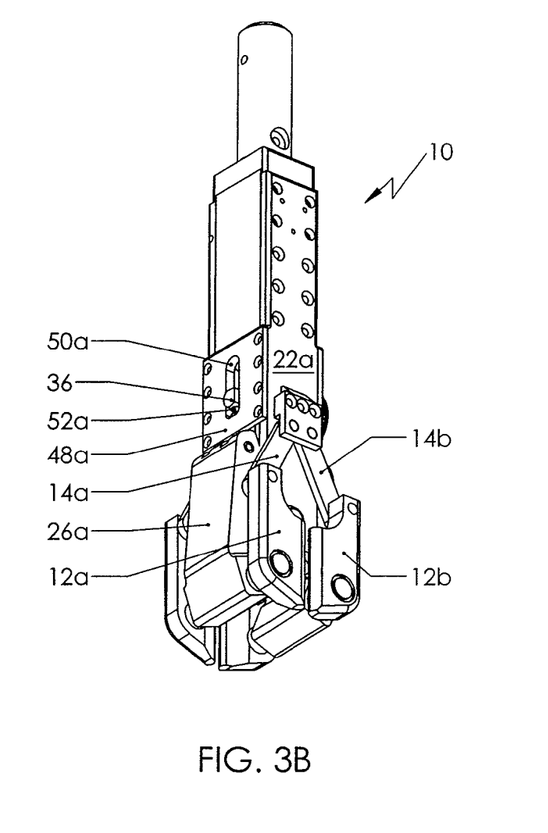
FIG. 3B is a schematic representation of a perspective top view of the jaw portion of the squeeze-off apparatus shown in FIG. 3A hereof with the top base member in place, illustrating the drive block stopping plate attached thereto and components of an embodiment of the stopping mechanism.

FIG. 3A is a schematic representation of the top view of tubing squeeze-off apparatus 10 illustrated in FIG. 1A hereof, with the top base member removed, showing squeeze-off jaws 12a and 12b in a preset crimping configuration as a result of drive block 42 being pushed forward by piston rod 44 with the consequent closing of inner jaws 26a and 26b; and FIG. 3B is a schematic representation of a perspective top view of the jaw portion of the squeeze-off apparatus shown in FIG. 3A hereof with top base member 22a in place, illustrating drive block stopping plate 48a attached thereto and with slot, 50a, therein confining the motion of stop rod 36, resting against adjustable stop 52a at one end thereof, thereby limiting the motion of drive block 42.

Figure 4A:
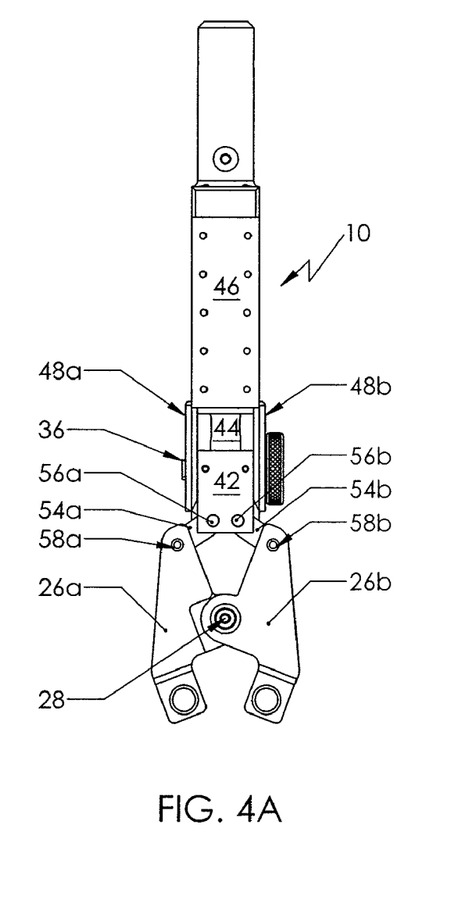
FIG. 4A is a schematic representation of the top view of the tubing squeeze-off apparatus illustrated in FIG. 1A hereof, with the top base member and the squeeze-off jaws removed showing the inner jaws in their preset closed configuration as a result of the drive block being moved forward.
Figure 4B:
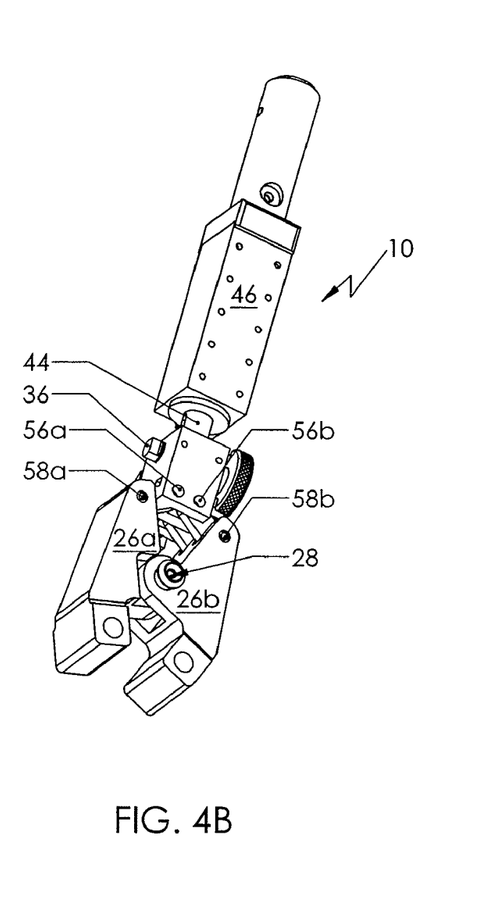
FIG. 4B is a schematic representation of a perspective top view of the jaw portion of the tubing squeeze-off apparatus illustrated in FIG. 4A hereof with the top base member having been removed.

FIG. 4A is a schematic representation of the top view of the tubing squeeze-off apparatus 10 illustrated in FIG. 1A hereof, with the top base member and the crimping jaws removed showing inner jaws 26a and 26b in their preset closed configuration as a result of drive block 42 being moved forward by piston rod 44. Drive rods, 54a, and 54b, are pivoted at one end, 56a, and 56b, respectively, at one end in drive block 42, and at the other end at pivot locations, 58a, and 58b, respectively, in inner jaws 26a and 26b, respectively. Inner jaws 26a and 26b are also pivoted at pivot location 28 located in top base member 22a, and bottom base member 22b, not shown in FIG. 4A. FIG. 4B is a schematic representation of a perspective top view of the jaw portion of tubing squeeze-off apparatus 10 illustrated in FIG. 4A hereof with top base member and stopping plates 48a and 48b having been removed, illustrating four drive rods pivotably connected to drive block 42, two parallel drive rods for inner jaw member 26a, pivoted at common pivot location 58a, and two parallel rods for inner jaw member 26b, pivoted at common pivot location 58b.

Figure 4C:
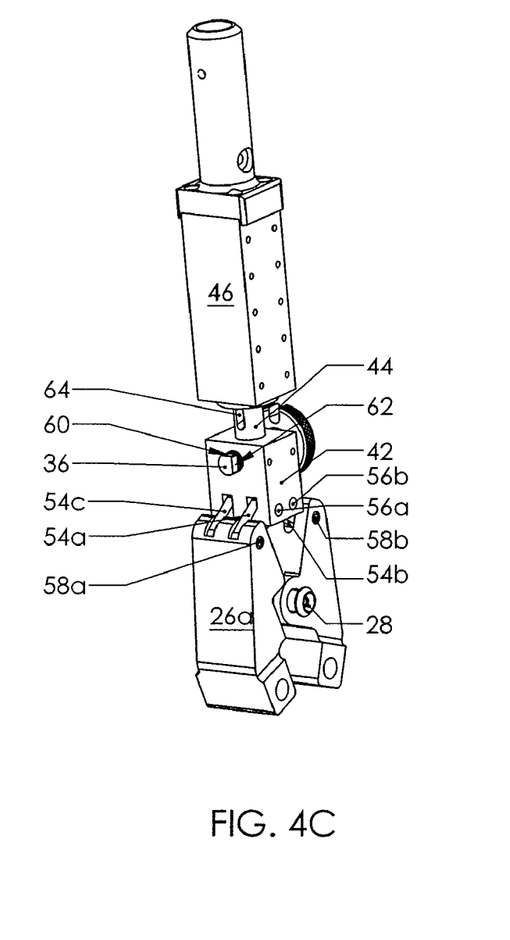
FIG. 4C is a schematic representation of the side perspective view of the jaw portion of the tubing squeeze-off apparatus shown in FIG. 4A hereof, illustrating the rotatable drive block stop rod in the drive block and the slot in the piston.
Figure 4D:
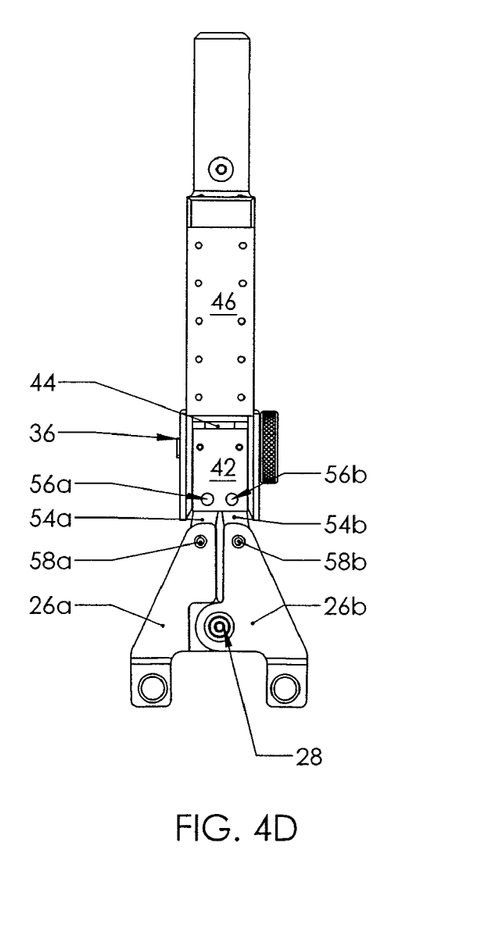
FIG. 4D is a schematic representation of the top view of the tubing squeeze-off apparatus illustrated in FIG. 1A hereof with the top base and squeeze-off jaws removed showing the inner jaws in their open configuration as a result of the drive block being moved to its rearward location.

FIG. 4C is a schematic representation of the side perspective view of the jaw portion of tubing squeeze-off apparatus 10 shown in FIG. 4A hereof, illustrating rotatable stop rod 36, shown having two flat sides, 60, and 62, disposed in drive block 42 and slot, 64, in piston 44, the function of which will be described hereinbelow, and three of the four drive rods, 54a-54c. FIG. 4D is a schematic representation of the top view of tubing crimping apparatus 10 illustrated in FIG. 1A hereof with the top base and crimping jaws removed showing the inner jaws 26a and 26b in their open configuration as a result of drive block 42 being moved to its rearward location by piston rod 44.

Figure 5A:
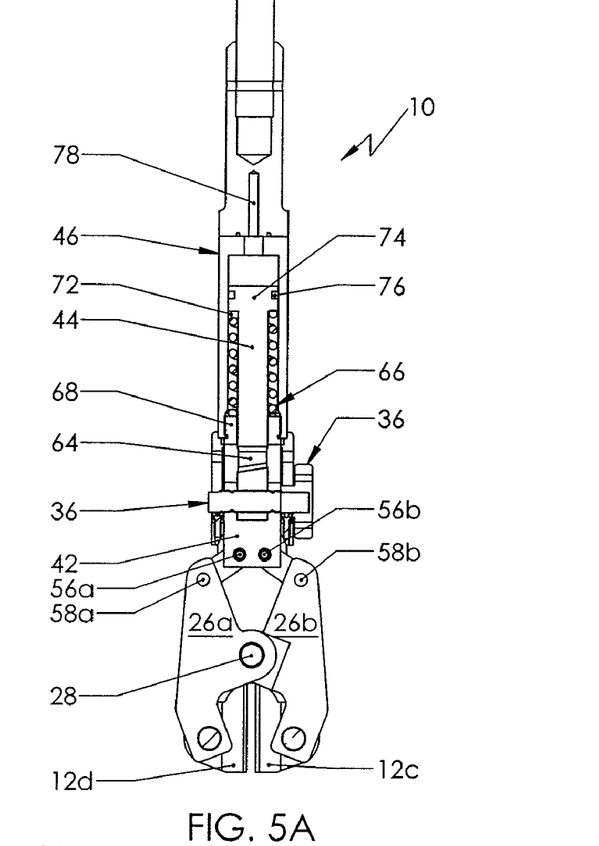
Figure 5B:
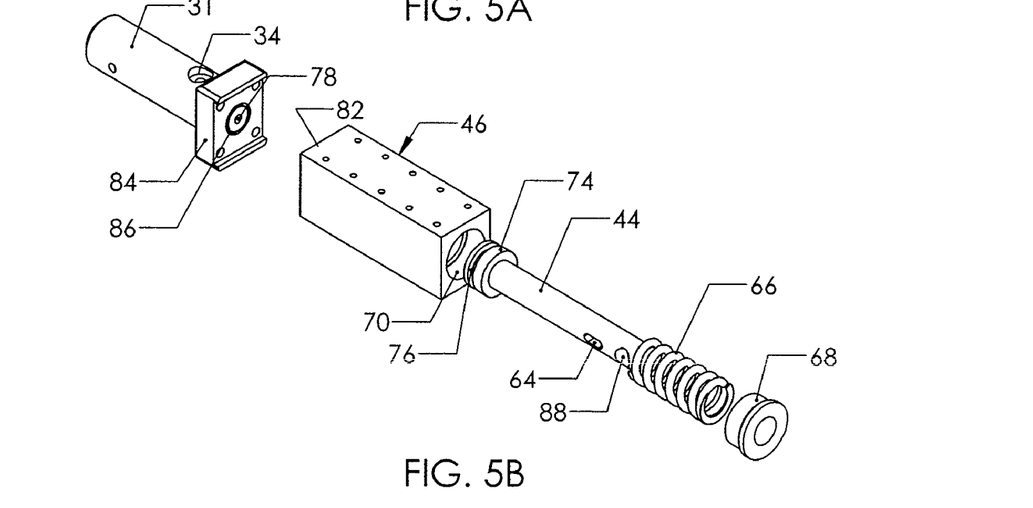
FIG. 5B is a schematic representation of an exploded view of the piston and cylinder shown in FIG. 5A hereof, further illustrating an embodiment of the handle mounting member attached thereto.

FIG. 5A is a schematic representation of a top schematic view of a cutaway of piston 44 and cylinder 46 of tubing crimping apparatus 10 illustrated in FIG. 1A hereof, with the top base member having been removed, and showing return spring, 66, and retainer gland nut, 68, which is affixed in exit hole, 70, of cylinder 46, having bore, 72, therein, return spring 66 acting against piston head, 74, to return piston 44 to its withdrawn condition in bore 72 of cylinder 46 when the pressure from hydraulic source 32 (FIG. 1A) is reduced. Piston head 74 having o-ring, 76, is forced downward in bore 72 under pressure introduced through passage, 78, from hole 34. FIG. 5B is a schematic representation of an exploded view of the components of piston 44 and cylinder 46 shown in FIG. 5A hereof, further illustrating an embodiment of handle mounting member, 31, sealably attached to face, 82, of cylinder 46 by means of flange, 84, having o-ring, 86, for providing the hydraulic seal to cylinder 46. Hole, 88, in piston rod 44 is adapted to receive drive block stop rod 36.

Figure 6A:
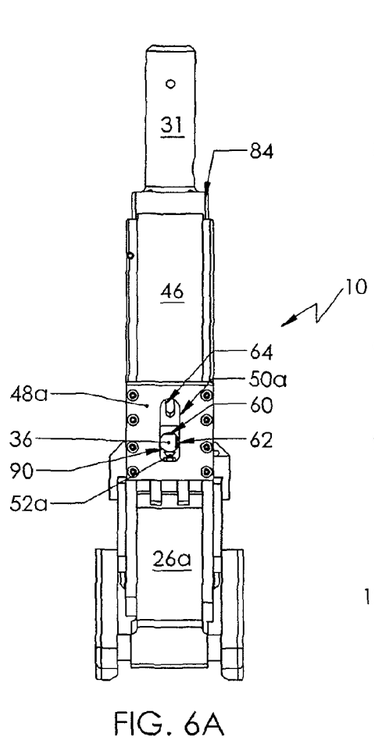

FIG. 6A is a schematic representation of a side view of slotted drive block stopping plate 48a illustrating slotted piston 44 attached to the drive block 42, not shown in FIG. 6A, and cylindrical rod 36 having at least one machined face 60 and 62 passing through the drive block and extending through slot 50a in stopping plate 48a and engaging adjustable stop 52a attached to the forward end of the slot, thereby preventing further forward motion of the drive block if the hydraulic pressure is further increased. Knurled knob 38, not shown in FIG. 6A, rotates either rounded portion, 90, of stop rod 36, or either flat portion 60 or 62 to contact adjustable stop 52a, thereby presetting the closed position of crimping jaws 12a and 12b. A similar configuration is present for drive block stopping plate 48b, having adjustable stop, 52b, not shown in FIG. 6a.

Figure 6B:
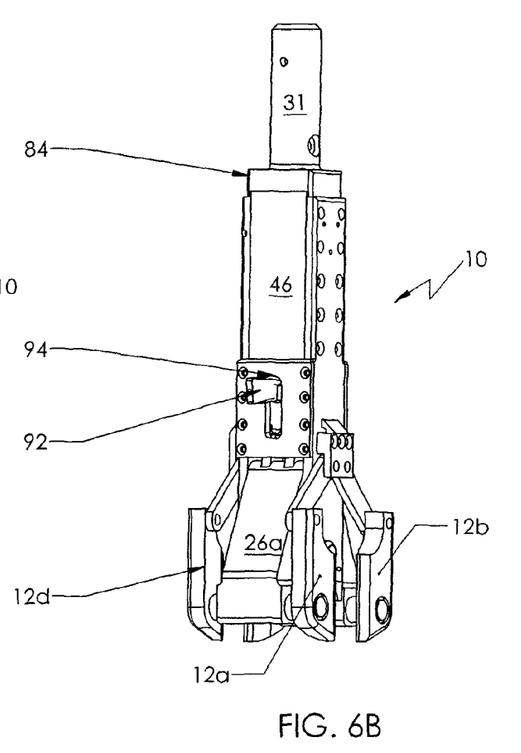
FIG. 6B is a schematic representation of a perspective side view of the inner jaw of the tubing squeeze-off apparatus illustrated in FIG. 6A hereof, FIGS. 6A and 6B showing how the squeeze-off jaws are preset to chosen spacings when closed, and how the force on the crimped tubing is maintained by the tubing squeeze-off apparatus when hydraulic pressure is reduced.

FIG. 6B is a schematic representation of the side view of slotted drive block stopping plate 48a, shown in FIG. 6A hereof, illustrating tapered stop, 92, inserted into slot 64 in piston 44, engaging rearward portion, 94, of the slot in the stopping plate, thereby preventing reward motion of the drive block with consequent opening of crimping jaws 12a-12d when the hydraulic or pneumatic pressure is reduced, and it is desired that the tubing remain crimped by tubing crimping apparatus 10. For convenience lower base member 22b may be adapted, 96 (FIG. 1B), to hold tapered stop 94.

It should be mentioned that drive block 42 may also be operated by a screw mechanism, not shown in the FIGURES, as would be known to those having skill in the related art area in the event that hydraulic operation of tubing crimping apparatus 10 is undesirable or inconvenient.

To achieve uniform crimping of tubing, squeeze-off jaws 12a-12d are designed to close as pairs 12a and 12b, and 12c and 12d, in a parallel manner throughout their range of motion, by making the radial distance from center pivot 28 to upper jaw pivot points 24a and 24b equal to the radial distance between base member 22a pivot points 18a and 18b of the upper jaw positioning bars 14a and 14b, and the upper jaw pivot points 16a and 16b, with the same conditions for lower jaws 12c and 12d.

Figure 7:
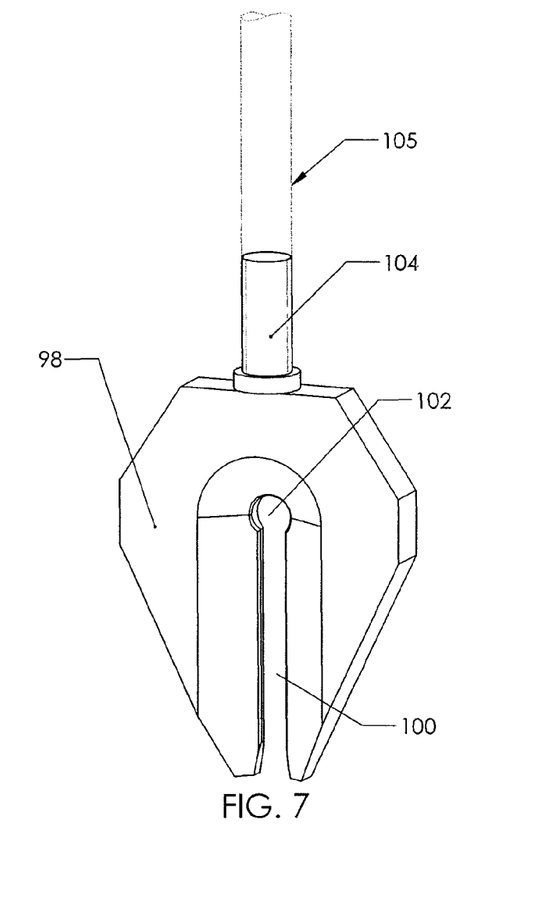
FIG. 7 is a schematic representation of a perspective view of the squeeze-off retainer device of the present invention.

FIG. 7 is a schematic representation of a perspective view of squeeze-off retainer, 98, device of the present invention. The width of channel, 100, is chosen to match the thickness of the crimped or squeezed-off tubing after being crimped by squeeze-off tool 10. Relief, 102, permits some expansion of the ends of the crimped tubing. Handle holder, 104, allows retainer 98 to be hammered onto a crimped portion of a tube and secures handle, 105, by using mating threaded portions on both parts, as an example, for removing the retainer when the tube is to be reopened.

Figure 8:
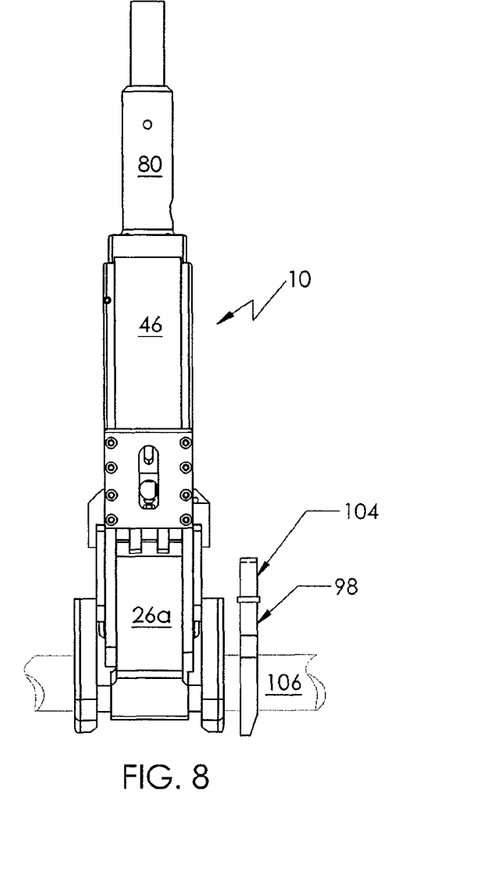
FIG. 8 is a schematic representation of a side view of cooperation between the tubing squeeze-off apparatus and a retainer device, illustrating the use of the squeeze-off retainer on one side of the tubing squeeze-off apparatus for maintaining the crimped condition of the tube if the tubing squeeze-off apparatus is removed.

FIG. 8 is a schematic representation illustrating cooperation between tubing squeeze-off apparatus 10 and squeeze-off retainer device 98, shown in FIG. 7, hereof, wherein retainer 98 is disposed on one side of tubing squeeze-off apparatus 10 for maintaining the crimped condition of the tube or pipe, thereby permitting tubing squeeze-off apparatus 10 to be removed. A second retainer may be used on the other side of tubing squeeze-off apparatus 10 if additional security is desired, or if a tubing puncture is to be repaired.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A tubing squeeze-off apparatus, comprising in combination:
   a first elongated base member having a flat first side and a flat second side;
   a second elongated base member having a flat first side and a flat second side, wherein the first side of said first base member is parallel to, spaced apart from and faces the first side of said second base member;
   a drive block adapted to slide between said first base member and said second base member;
   a first inner jaw member rotatable about a first pivot centrally located on said first jaw member, and in the vicinity of one end of said first base member and said second base member;
   a second inner jaw member rotatable about the first pivot centrally located on said second jaw member, said first jaw member and said second jaw member rotating between said first base member and said second base member, said first jaw member and said second jaw member each having a leg portion on each side of the pivot thereof together forming a generally C-shaped opening capable of receiving said tubing;
   at least one pair of actuating bars, one end of each actuating bar pivotably attached to an end of said first inner jaw member on either side thereof and opposite the leg portion thereof, the opposite end of each actuating bar being pivotably attached to said drive block;
   a first squeeze-off jaw rotatable in the vicinity of a first end thereof about a second pivot location on the leg portion of said first inner jaw member;
   a second squeeze-off jaw rotatable in the vicinity of a first end thereof about a second pivot location on the leg portion of said second inner jaw member;
   a pair of first positioning bars, one end of each first positioning bar pivotably attached in the vicinity of a second end of said first squeeze-off jaw and a second end of said second squeeze-off jaw opposite the first end thereof, the second end of each first positioning bar being pivotably attached to said first base member;
   a third squeeze-off jaw rotatable in the vicinity of a first end thereof about a second pivot location on the leg portion of said first inner jaw member;
   a fourth squeeze-off jaw rotatable in the vicinity of a first end thereof about a second pivot location on the leg portion of said second inner jaw member;
   a pair of second positioning bars, one end of each second positioning bar pivotably attached in the vicinity of a second end of said third squeeze-off and said fourth squeeze-off jaw opposite the first end thereof, the second end of each second positioning bar being pivotably attached to said second base member; and
   means for moving said drive block between said first base member and said second base member;
   whereby a uniform gap is maintained between said first squeeze-off jaw and said second squeeze-off jaw and between said third squeeze-off jaw and said fourth squeeze-off jaw as said drive block is moved.

2. The tubing squeeze-off apparatus of claim 1, wherein said means for moving said drive block comprises a hydraulic cylinder attached to said first base member and said second base member, a piston actuated by said cylinder and attached to said drive block, and a source of hydraulic pressure.

3. The tubing squeeze-off apparatus of claim 2, further comprising a coil spring through which said piston passes for returning said drive block to a position whereby said first squeeze-off jaw and said second squeeze-off jaw are separated, when the hydraulic pressure is reduced.

4. The tubing squeeze-off apparatus of claim 2, further comprising:
   a first drive block stopping plate perpendicular to and attached to said first base member and said second base member, having a first slot with a chosen length therein and having a forward end and a rearward end;
   a second drive block stopping plate perpendicular to and attached to said first base member and said second base member, spaced apart from and facing said first stopping plate, and having a second slot with a chosen length therein opposing the first slot and having a forward end and a rearward end;
   a cylindrical pin passing through said drive block and adapted to pass through the first slot and the second slot, whereby the motion of said drive block is limited by the chosen length of the first slot and the second slot at the forward end and the rearward end.

5. The tubing squeeze-off apparatus of claim 4, further comprising adjustable stops at the forward end of each of the first slot and the second slot for determining the minimum distance between said first squeezed-off jaw and said second squeeze-off jaw, and between the third squeeze-off jaw and the fourth squeeze-off jaw.

6. The tubing squeeze-off apparatus of claim 5, wherein said pin has at least one flat longitudinal surface such that the motion of said drive block is limited in the forward direction by the at least one flat surface and said stops.

7. The tubing squeeze-off apparatus of claim 4, wherein said piston passes between said first stopping plate and said second stopping plate, and has a slot therein in the region of the first slot and the second slot, said tubing squeeze-off apparatus further comprising a tapered pin adapted to be inserted into the slot through either the first slot or the second slot and through the other slot, respectively, wherein said drive block is prevented from rearward motion when the hydraulic pressure is released.

8. The tubing squeeze-off apparatus of claim 1, further comprising a first curved insert having a chosen diameter and attached to the end of said first base member containing the first pivot, and a second curved insert having a diameter equal to that of the chosen diameter and attached to the end of said second base member containing the first pivot, said first insert and said second insert adapted for receiving the tubing to be crimped.

9. The tubing squeeze-off apparatus of claim 1, further comprising a first pivot block attached to the second side of said first base member, wherein the second end of each first positioning bar is pivotably attached to said first pivot block; and a second pivot block attached to the second side of said second base member, wherein the second end of each second positioning bar is pivotably attached to said second pivot block.

10. The tubing squeeze-off apparatus of claim 1, wherein said tubing comprises resilient plastic tubing.

11. The tubing squeeze-off apparatus of claim 10, wherein said plastic tubing comprises polyethylene tubing.

12. The tubing squeeze-off apparatus of claim 2, further comprising an elongated handle attached to said cylinder at the end thereof opposite said piston.

13. The tubing squeeze-off apparatus of claim 1, further comprising at least one squeeze-off retainer for maintaining said tubing in a squeezed-off condition.

14. The tubing squeeze-off apparatus of claim 1, wherein the distance from the first pivot to the second pivot is equal to the distance between the pivotable attachment of each of said first positioning bars to said first base member and the pivotable attachment of each of said first positioning bars in the vicinity of the second end of said first squeeze-off jaw and said second squeeze-off jaw, and equal to the distance between the pivotable attachment of each of said second positioning bars to said second base member and the pivotable attachment of each of said second positioning bars in the vicinity of the second end of said third squeeze-off jaw and said fourth squeeze-off jaw.

15. A method for squeezing-off tubing having a puncture or break in the wall thereof, comprising:
   providing a tubing squeeze-off apparatus having a first pair of squeeze-off jaws and a second pair of squeeze-off jaws spaced apart from the first pair of squeeze-off jaws;
   providing a first squeeze-off retainer effective for maintaining the tubing in a squeezed-off condition, and a second squeeze-off retainer effective for maintaining the tubing in a squeezed-off condition;
   locating the squeeze-off apparatus such that the first pair of squeeze-off jaws straddles the tubing on one side of the puncture or break of the tubing, and the second pair of squeeze-off jaws straddles the tube on the side of the puncture or break opposite from the first pair of squeeze-off jaws;
   crimping the tubing on both sides of the puncture or break by simultaneously closing the first pair of squeeze-off jaws and the second pair of squeeze-off jaws;
   placing the first retainer on the tubing alongside the first pair of squeeze-off jaws;
   placing the second retainer on the tubing alongside the second pair of squeeze-off jaws;
   opening the first pair of squeeze-off jaws and the second pair of squeeze-off jaws; and
   removing the squeeze-off apparatus from the tubing.

16. The method of claim 15, wherein the tubing comprises resilient plastic tubing.

17. The method of claim 16, wherein the plastic tubing comprises polyethylene tubing.

* * * * *